US008656017B2

(12) United States Patent
Wang et al.

(10) Patent No.: US 8,656,017 B2
(45) Date of Patent: Feb. 18, 2014

(54) PEER-TO-PEER COLLABORATION SYSTEM WITH EDGE ROUTING

(75) Inventors: Jim J. Wang, Dover, MA (US); Thomas B. Titchener, Concord, MA (US); Thomas D. Sanfilippo, Somerville, MA (US)

(73) Assignee: Microsoft Corporation, Redmond, WA (US)

( * ) Notice: Subject to any disclaimer, the term of this patent is extended or adjusted under 35 U.S.C. 154(b) by 575 days.

(21) Appl. No.: 11/803,800

(22) Filed: May 16, 2007

(65) Prior Publication Data
US 2008/0288580 A1 Nov. 20, 2008

(51) Int. Cl.
G06F 15/173 (2006.01)

(52) U.S. Cl.
USPC ......... 709/226; 709/223; 370/230.1; 370/231

(58) Field of Classification Search
USPC .................................................. 709/226, 223
See application file for complete search history.

(56) References Cited

U.S. PATENT DOCUMENTS

| | | | |
|---|---|---|---|
| 7,028,183 B2 | 4/2006 | Simon et al. | |
| 7,092,391 B2 | 8/2006 | Umeda | |
| 7,151,769 B2 | 12/2006 | Stanforth | |
| 7,213,047 B2 | 5/2007 | Yeager et al. | |
| 7,803,052 B2 | 9/2010 | Multerer et al. | |
| 7,912,046 B2 | 3/2011 | Li et al. | |
| 8,024,727 B2 | 9/2011 | Taillefer et al. | |
| 2002/0150075 A1 | 10/2002 | Belcea | |
| 2003/0161330 A1* | 8/2003 | Umeda | 370/400 |
| 2004/0098503 A1* | 5/2004 | Zhang et al. | 709/238 |
| 2004/0205245 A1 | 10/2004 | Le Pennec et al. | |
| 2004/0249911 A1 | 12/2004 | Alkhatib et al. | |
| 2004/0249973 A1 | 12/2004 | Alkhatib et al. | |
| 2005/0286519 A1* | 12/2005 | Ravikumar et al. | 370/389 |
| 2006/0077952 A1* | 4/2006 | Kubsch et al. | 370/351 |
| 2006/0098607 A1* | 5/2006 | Zeng et al. | 370/338 |
| 2006/0126611 A1* | 6/2006 | Kelly et al. | 370/389 |
| 2006/0146813 A1 | 7/2006 | Biswas et al. | |
| 2006/0182100 A1 | 8/2006 | Li et al. | |
| 2006/0209778 A1 | 9/2006 | Feige et al. | |
| 2006/0215684 A1 | 9/2006 | Capone | |

(Continued)

OTHER PUBLICATIONS

Robbert Van Renesse et al., "Collaborative Networking in an Uncooperative Internet", *Dept. of Computer Science*, Cornell University, 10 pgs.

(Continued)

*Primary Examiner* — Dustin Nguyen
*Assistant Examiner* — Joel Mesa
(74) *Attorney, Agent, or Firm* — Jim Ross; Micky Minhas

(57) ABSTRACT

A peer-to-peer collaboration system in which changes to a shared space may be broadcast to all of the peers in a collaboration session using messages sent with a combination of addressing techniques. Messages may be addressed for direct peer-to-peer transmission, indirect transmission through another peer or indirect transmission through a server. The type of addressing used to communicate with each peer is determined through the use of a routing table. The routing table defines interconnected groups of peers and may be used to select one or more peers in each group as the initial recipients of the message. The initial recipients may forward the message to other peers within their groups, such that all peers receive the message. For peers behind a NAT, one or more NAT traversal techniques may be used to obtain information to construct the routing table.

20 Claims, 9 Drawing Sheets

(56) References Cited

U.S. PATENT DOCUMENTS

2007/0019545 A1 1/2007 Alt et al.
2007/0036143 A1 2/2007 Alt et al.
2007/0076729 A1* 4/2007 Takeda .......................... 370/401

OTHER PUBLICATIONS

Neil Finlayson et al., "P2P and Client-Server Hybrids: Groove-Enabling a J2EE Portal Using Web Services" *NAE Research Conference*, Oct. 2005, Italy, 13 pgs.
Dejan S. Milojicic et al., "Peer-to-Peer Computing", *Hewlett-Packard Company*, Jul. 2002, 51 pgs.
Andrew Biggadike et al., "NATBLASTER: Establishing TCP Connections between Hosts behind NATs", *SIGCOMM Asia Workshop*, China, 2005, 10 pgs.
International Search Report and Written Opinion for International Application Serial No. PCT/US2008/060957 mailed Sep. 2, 2008.
Office Action from the State Intellectual Property Office of the People's Republic of China regarding Application No. 200880016321.3 dated Jun. 23, 2011.
Office Action from the State Intellectual Property Office of the People's Republic of China regarding Application No. 200880016321.3 dated Apr. 26, 2012.
Office Action from the State Intellectual Property Office of the People's Republic of China regarding Application No. 200880016321.3 dated Sep. 21, 2012.
Office Action from the State Intellectual Property Office of the People's Republic of China regarding Application No. 200880016321.3 dated Feb. 5, 2013.
Office Action from the State Intellectual Property Office of the People's Republic of China regarding Application No. 200880016231.3 dated Jun. 23, 2011.
Office Action from the State Intellectual Property Office of the People's Republic of China regarding Application No. 200880016231.3 dated Apr. 26, 2012.

* cited by examiner

PEER-TO-PEER COLLABORATION SYSTEM WITH EDGE ROUTING

BACKGROUND

Peer-to-peer collaboration systems are used, generally in business settings, to allow multiple users to work collaboratively even though the users may be in different locations. A peer-to-peer collaboration system is implemented with computing devices interconnected by a network. Each of the peer devices may maintain a copy of data or other information that is displayed to or acted on by the collaborating users. That information creates what is called a "shared space."

Client software in each of the peer devices allows the user of that device to change the copy of the shared space maintained by that device. As each change is made, the client broadcasts messages indicating the changes made to the shared space. Other peer devices in a collaboration session receive those change messages and make corresponding changes to their copies of the shared space. In this way, all of the copies of the shared space are synchronized and every user in the collaboration session can view changes made by every other user.

However, for the collaboration system to function as intended, each peer device must be able to communicate changes to every other peer device. A network, such as the Internet, theoretically can be used to allow communication between any two peer devices coupled to the network. However, some private networks, though coupled to the Internet, are not configured to allow peer devices coupled to the Internet through the private network to engage in peer-to-peer communications with devices outside the private network. For example, many local area networks (LANs) use network address translation (NAT) at the interface between the private network and the Internet. Address translation can disrupt messages directed to a peer behind a NAT device, thereby interfering with peer-to-peer communication.

To avoid the disruption of a collaboration session when some devices are behind a NAT device or are otherwise unreachable from other peers, collaboration systems use relay servers. A peer unable to communicate directly with another peer may communicate indirectly by sending the message first to a relay server. The relay server may forward the message to the recipient peer. In some instances, the relay server will forward the message directly to the recipient peer. Though, in other scenarios, the message will be forwarded through one or more other relay servers before it reaches the recipient peer.

SUMMARY OF INVENTION

To reduce congestion caused by routing change messages through relay servers in a peer-to-peer communication session, the changes are communicated in messages that may be distributed using direct peer-to-peer messages. Though a relay server may be used for some messages, reducing the load on the relay server in handling a large number of change messages may reduce the cost of a peer-to-peer collaboration system and may increase scalability of the system.

To facilitate direct peer-to-peer communication, a routing table that defines interconnections between peers may be used to address messages. The routing table may identify groups of peers for which communication may occur using direct peer-to-peer messages. A peer initiating a change and broadcasting that change to other peers in the collaboration session may select as an initial recipient a peer in each group, which may receive the message directly or indirectly from the initiating peer. The initial recipient may forward the message to one or more other peers in the group. Each peer that receives the message may in turn further propagate the message through peer-to-peer communications to other peers in the group until all peers in the collaboration session receive the message.

A relay server, or other component of the collaboration system, may participate in construction of the routing table. Such a server may receive probing messages from the peers and analyze those messages to obtain information about the address at which other peers may be able to communicate with the peer. If the peer is behind a Network Address Translation (NAT) device, information obtained by the server may also be used to identify an approach to traverse the NAT device to reach the peer, potentially expanding the number of peers in a collaboration session reachable with direct peer-to-peer communication.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have appreciated that using a relay server to facilitate indirect communication between peers that cannot directly communicate in a collaboration session of a peer-to-peer collaboration system can create an undesirable amount of load around a relay server. As a result, effective operation of a peer-to-peer collaboration system may require an undesirable amount of resources, such as network bandwidth or memory, associated with a relay server. The inventors have also recognized that load, and performance degradation associated with server load, increases as more peer devices are unreachable by other peer devices. One reason that a peer device may be unreachable for direct communication is that the peer may be behind a NAT device. Unfortunately, the likelihood that a peer device is behind a NAT device has increased as more users work from home or are connected to the Internet through local area networks that employ NAT devices.

According to embodiments of the invention, the load on a relay server of a peer-to-peer collaboration system may be reduced by using edge routing techniques. Such techniques increase the amount of change messages or other messages associated with a peer-to-peer collaboration system that can be passed directly from peer-to-peer or indirectly through one or more intermediary peers to other peers. Consequently, there is a decrease in server load because those messages do not pass through a relay server. The effectiveness of such a system can be further improved by incorporating NAT traversal techniques that allow peer-to-peer communication with devices that are behind NAT devices.

Figure 1:
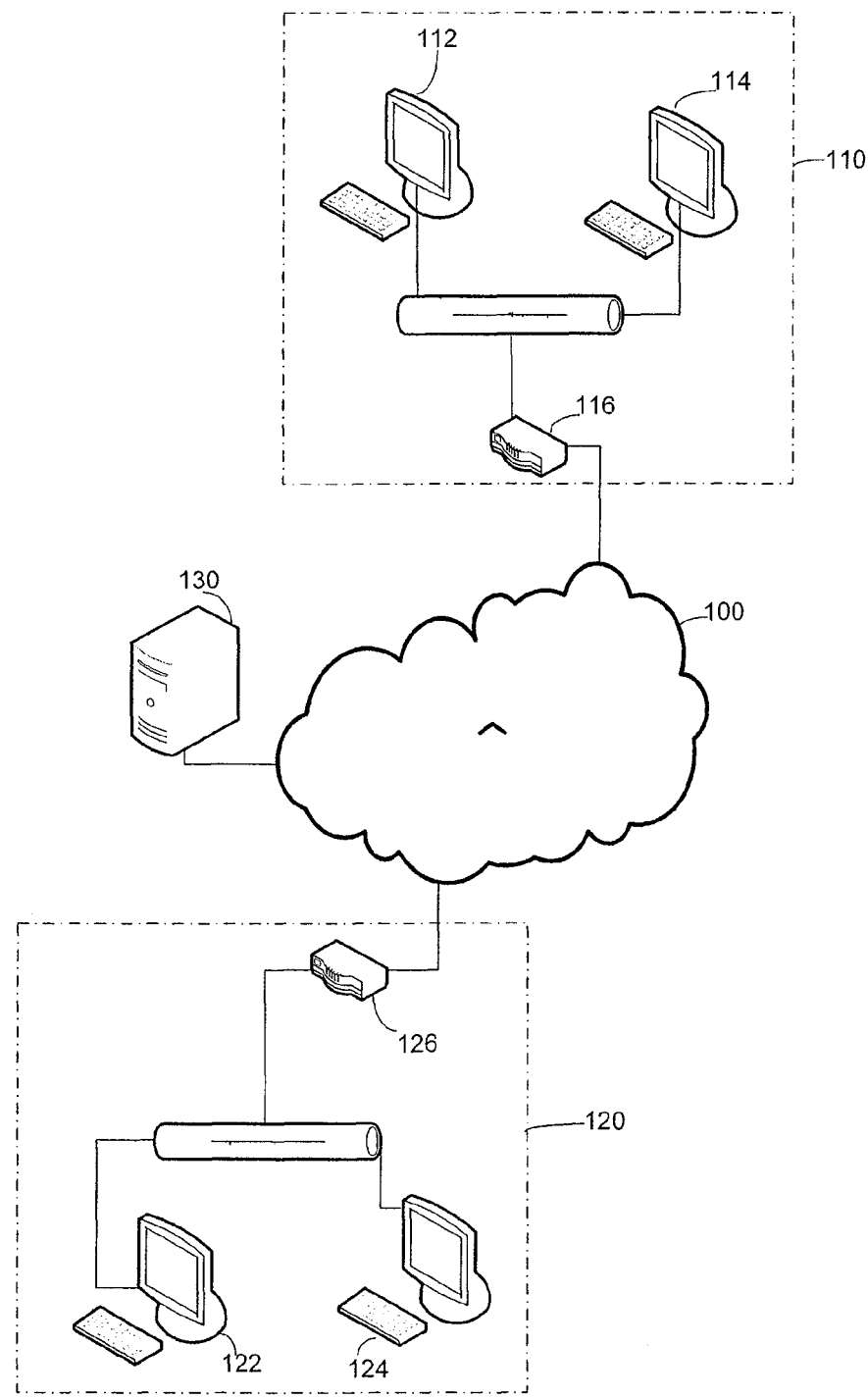
FIG. 1 is a sketch of a prior art peer-to-peer collaboration system.

In some embodiments, the invention may be implemented using components of a peer-to-peer collaboration system as are known in the art. As an example of the types of components that are known, FIG. 1 shows a prior art peer-to-peer collaboration system. In the example of FIG. 1, multiple peer devices communicate over network 100, which may be the Internet. However, in constructing embodiments of the invention, an enterprise network or any other suitable network may carry communications between peers.

As shown in FIG. 1, some peers may be connected to network 100 through LANs. For example, LAN 110 is coupled to network 100 through router 116. Peer devices connected to LAN 110, such as peers 112 and 114, may access network 100 through router 116 that couples LAN 110 to network 100.

In the embodiment illustrated, router 116 may act as a NAT device. Accordingly, though peers 112 and 114 may send messages outbound through router 116, a peer device outside of local area network 110 may be unable to respond to peers 112 and 114 using address information in those messages because messages addressed in that fashion will not pass through router 116 to the intended peer devices.

For example, LAN 120 is shown to contain peer devices 122 and 124. Though peer devices 122 and 124 may access network 100 through router 126, network address translation within router 116 may preclude messages sent by peer devices 122 or 124 from reaching peers 112 and 114. In this example, the unreachability may be symmetrical if router 126 also performs a type of network address translation that blocks inbound messages from reaching peers 122 and 124.

To allow communication between either of peers 122 or 124 and peers 112 or 114, relay server 130 may be used. Relay server 130 is here shown connected to network 100. Each of the peers 112, 114, 122 and 124 may establish communication with relay server 130. Because each of the peer devices 112, 114, 122 and 124 may send outbound messages through the NAT device it is behind, each may send messages destined for other peers to relay server 130. Relay server 130 may then forward the messages to the recipient peers. In this way, each peer in a peer-to-peer collaboration session may communicate change messages to any other peer. However, communication of each change may require one or more messages to pass through relay server 130.

FIG. 1 is a simplified sketch of a peer-to-peer collaboration system, which may mask the magnitude of the load around server 130 caused by processing change messages or other messages associated with a peer-to-peer collaboration system. For example, the four peers illustrated in the collaboration system of FIG. 1 may not be representative of the number of peers in a collaboration session. In many instances, more than four users may participate in a collaboration session. As the number of peers increases, the number of messages sent through relay server 130 may also increase. Further, an enterprise or other entity operating relay server 130 may wish to support multiple collaboration sessions. Each collaboration session may generate change messages routed through relay server 130. Accordingly, relay server 130 must have bandwidth, memory and other resources sufficient to process change messages generated by multiple users in multiple sessions.

Figure 2:
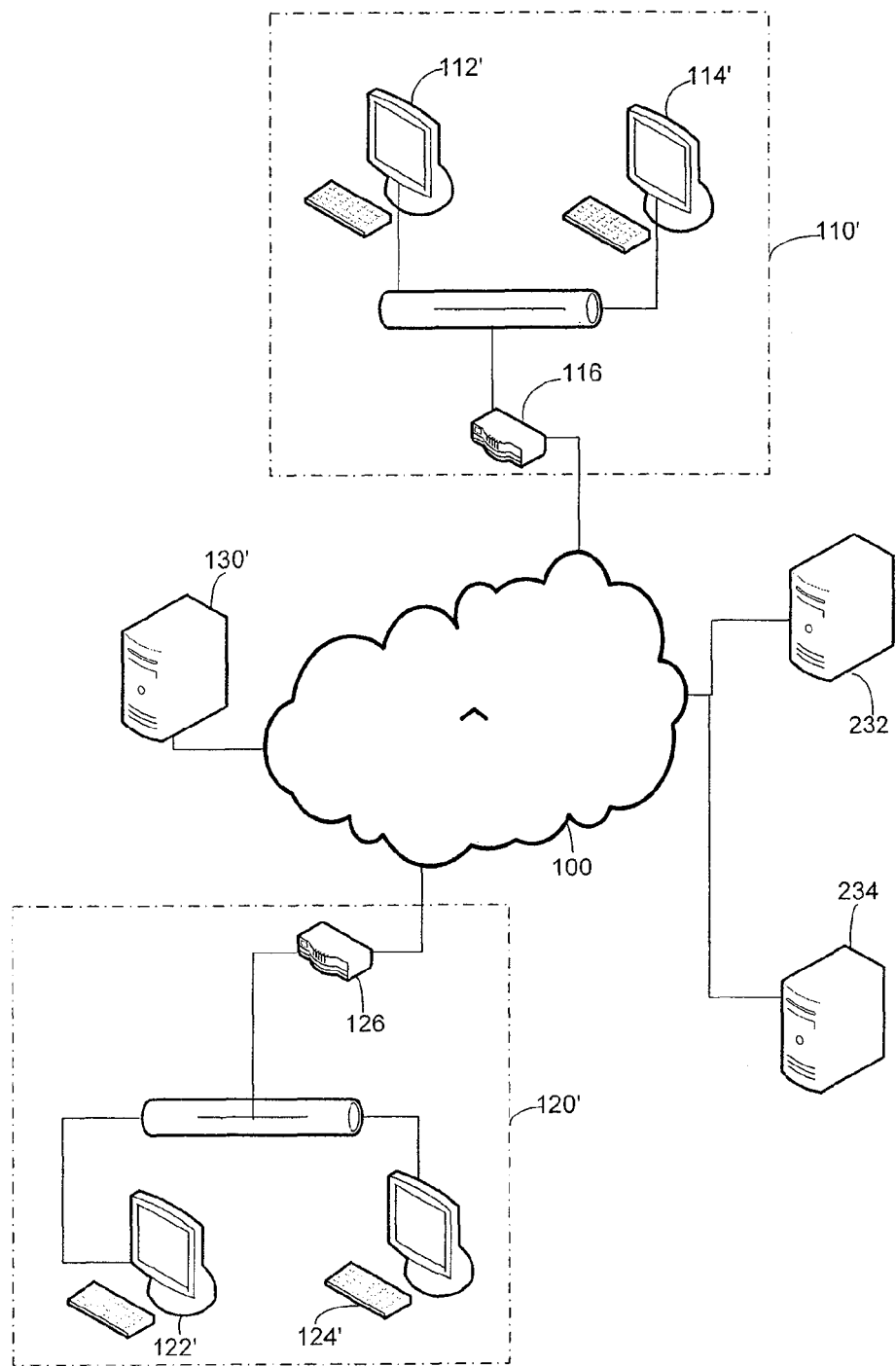
FIG. 2 is a sketch of a peer-to-peer collaboration system according to an embodiment of the invention.

To reduce the load on relay server 130, the components of the collaboration system illustrated in FIG. 1 may be adapted to support edge routing of change messages. Edge routing increases the number of change messages communicated from peer-to-peer without involving relay server 130. FIG. 2 illustrates a collaboration system according to an embodiment of the invention. In the example of FIG. 2, as in the example of FIG. 1, four peers are shown in the collaboration session. Also as in FIG. 1, the peers are connected to two local area networks. In the example of FIG. 2, local area network 110' contains peers 112' and 114'. Local area network 120' contains peers 122' and 124'. Peers attached to a local area network may be coupled to network 100 through a NAT device, such as routers 116 or 126. To facilitate communication between peers for which direct communication is not used, relay server 130' may be included in the peer-to-peer collaboration system. However, incorporation of edge routing can reduce the instances in which indirect communication through relay server 130' is used.

The specific components used to implement the peer-to-peer collaboration system are not critical to the invention. Accordingly, peers 112', 114', 122' and 124' may be implemented with devices having the same configurations as corresponding devices in FIG. 1, though programmed to support edge routing according to an embodiment of the invention. Those devices are illustrated as network enabled desktop computers. However, any suitable networked computing device may be used. Likewise, server 130' is shown implemented with the same type of device as server 130 (FIG. 1), also programmed to support edge routing. However, any suitable device may be used to implement server 130'. Also, in FIG. 2, NAT devices are illustrated by routers 116 and 126, though any suitable connection between peer devices and a network interconnecting other peer devices may be used and such connections may or may not employ NAT.

FIG. 2 illustrates a further difference from the system of the prior illustrated in FIG. 1. In the example illustrated, servers 232 and 234 are incorporated in the system. In this example, servers 232 and 234 may be any suitable networked devices and are programmed to support NAT traversal and address discovery for peers in a collaboration session, such as peers 112', 114', 122' and 124'. These functions allow a determination to be made for each of the peers 112', 114', 122' and 124' whether the device is reachable from devices external to its own LAN and, if reachable, address information that other peer devices may use to communicate change messages to those devices. With this information, a peer may identify other peers in a collaboration session to which it can directly send change information without first sending the messages to relay server 130'. For example, if a NAT traversal technique is identified to traverse router 116, peers outside of LAN 110', such as peers 122' and 124', may send change messages addressed directly to either or both of peers 112' and 114'.

In the embodiment of FIG. 2, two servers 232 and 234 are shown to be incorporated into the peer-to-peer collaboration system. These servers support execution of NAT identification techniques so that, once a type of NAT devices is identified, techniques that are effective to traverse such a NAT device may be used.

The two servers shown allow execution of NAT identification techniques that involve transmission and/or reception of messages from different devices. Server 232 and 234 may communicate with each other to coordinate their operation to perform such NAT identification techniques. However, it is not necessary that two physical servers be used to perform that function. For example, one additional server may cooperate with relay server 130' to perform such NAT identification techniques. Alternatively, a single server may be programmed to emulate multiple servers or servers connected to network 100 for other reasons may perform some or all of the NAT identification techniques. Accordingly, the specific hardware used for NAT identification is not a limitation on the invention and any suitable hardware may be used.

NAT traversal information may be used by the peers to increase the number of peers that can communicate without the use of a relay server. In operation of a peer-to-peer collaboration system, some of these peers will establish connections with each other. The peers may then be grouped into "neighborhoods" of peers that can communicate without the use of a relay server. By identifying neighborhoods, messages may be sent to one or a few peers within each neighborhood from which the messages may be propagated to other peers.

Even if an initial communication to a peer in a neighborhood requires a relay server, a message may be distributed from the initial peer to other peers within the neighborhood without further loading the relay server. For example, even if peer 122' is unable to traverse the NAT provided by router 116 to send messages directly to peers 112' and 114', peer 122' may send a single message through relay server 130' to peer 112'. Peer 112' may then forward the message to peer 114' and any other peer devices directly reachable by peer 112'. Obtaining information about the peers in the collaboration session through servers, such as servers 232 and 234, facilitates identification of such neighborhoods.

Figure 3A:
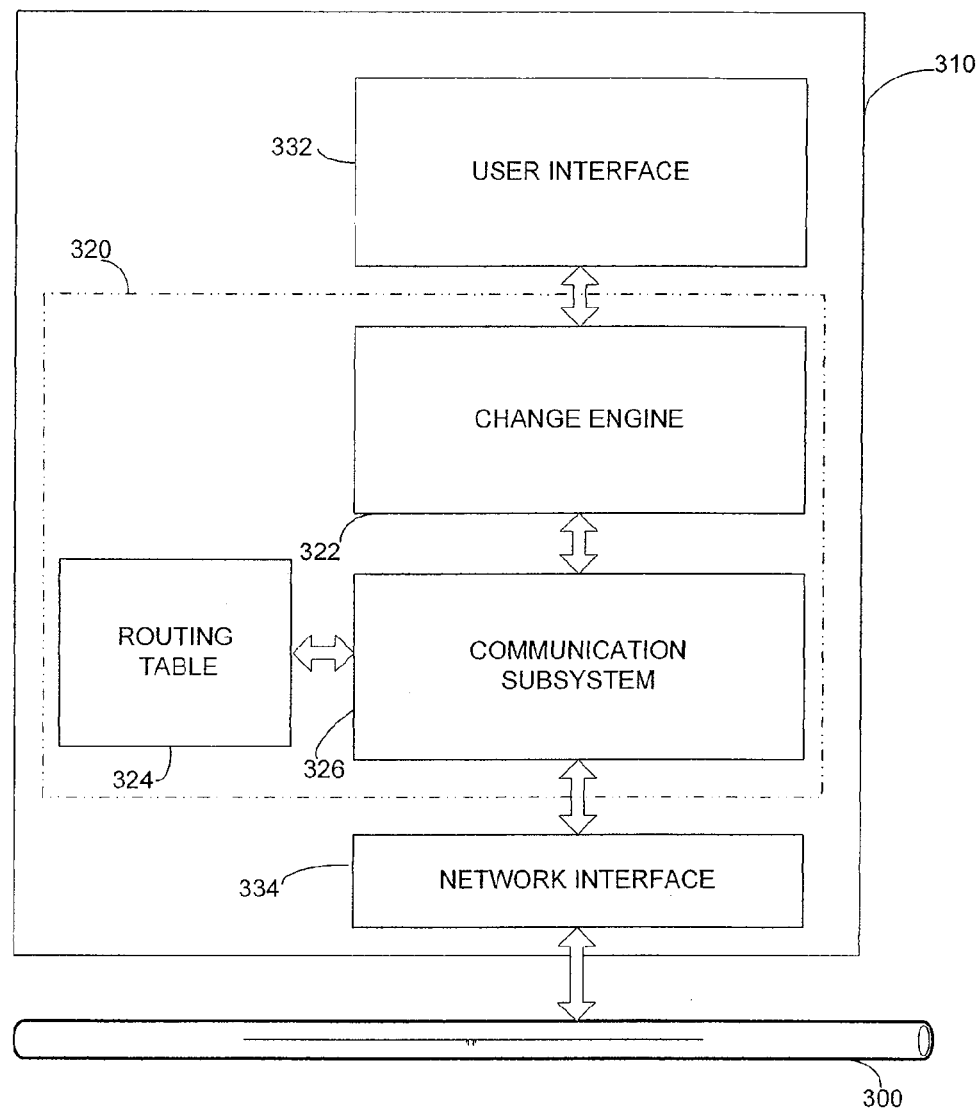
FIG. 3A is a functional block diagram of a peer in a peer-to-peer collaboration system according to an embodiment of the invention.

Turning to FIG. 3A, an illustration is provided of a peer device 310 that may be used in a peer-to-peer collaboration system according to an embodiment of the invention. Peer 310 may be a desk-top or lap-top computer. Though, any suitable computing device may be used as a platform for a peer. To facilitate communications with other peers, peer 310 include network interface 334 that couples peer 310 to network 300. Network 300 may be any suitable network, which may include one or more NAT devices.

Network interface 334 may be any suitable interface hardware and/or software that allows sending or receiving packets over network 300. In the embodiment illustrated, one or more packets may be used to convey messages containing change information about a shared space in a collaboration system. However, the specific media used to convey such messages and the protocol for those messages is not critical to the invention and any suitable network interface 334 may be used. For example, network interface 334 may be a conventional network interface card and associated driver software operating according to a known wired or wireless protocol.

Regardless of the specific form of network interface 334, a collaboration client component 320 may send messages to other peers in a collaboration session through network interface 334. Similarly, collaboration component 320 may receive messages from other peers through network interface 334. Collaboration client 320 may use those messages to maintain a copy of a shared space. Collaboration client component 320 may present a depiction of the shared space to a user through user interface 332. In an embodiment in which peer 310 is a conventional desk top or lap top computer, user interface 332 may include a display screen on which collaboration client component 320 may render a depiction of the shared space. However, the form of user interface 332 is not critical to the invention.

Similarly, user interface 332 may include one or more user input devices, allowing a user to input commands that cause changes to the shared space. Collaboration client component 320 may receive input from user interface 332 representing commands to change the shared space. These commands may trigger collaboration client component 320 to generate one or more messages communicating changes to the shared space to other peers in a collaboration session.

To generate and process change messages, collaboration client component 320 may include a "change engine" 322. Change engine 322 may be one or more software components similar to those used in conventional peer-to-peer collaboration systems. However, the specific implementation of change engine 322 is not critical to the invention and any suitable implementation may be used.

Such components may receive user input and translate the changes into change messages for distribution to other peers. Similarly, components within change engine 322 may receive change messages from one or more other peers in a collaboration session and determine the appropriate actions to make to a copy of the shared space to synchronize the copy of the shared space within peer 310 with copies of the shared space within other peers.

To exchange change messages with other peers, peer 310 includes communication subsystem 326, which performs functions associated with communication of changes among multiple peers in a collaboration session. For changes made by a user of peer device 310, communication subsystem 326 may broadcast messages describing those changes to other peers within the collaboration session. For changes made by users of other devices, communication subsystem 326 may receive and order the messages before passing them to change engine 322. Such functions may be performed in the same fashion as in a known peer-to-peer collaboration system or in any suitable fashion. However, communication subsystem 326 may differ from a communication component in a known peer-to-peer collaboration system in that it may be adapted to support edge routing.

To facilitate directing messages to other peers within the collaboration system, as occurs with edge routing, collaboration client component 320 may include routing table 324. Routing table 324 may contain information from which communication subsystem 326 may determine an appropriate mechanism for addressing messages conveying changes made by a user of peer 310. In addition, communication subsystem 326 may use routing table 324 to select peers to which it forwards messages received from other peers in a collaboration session.

Figure 3B:
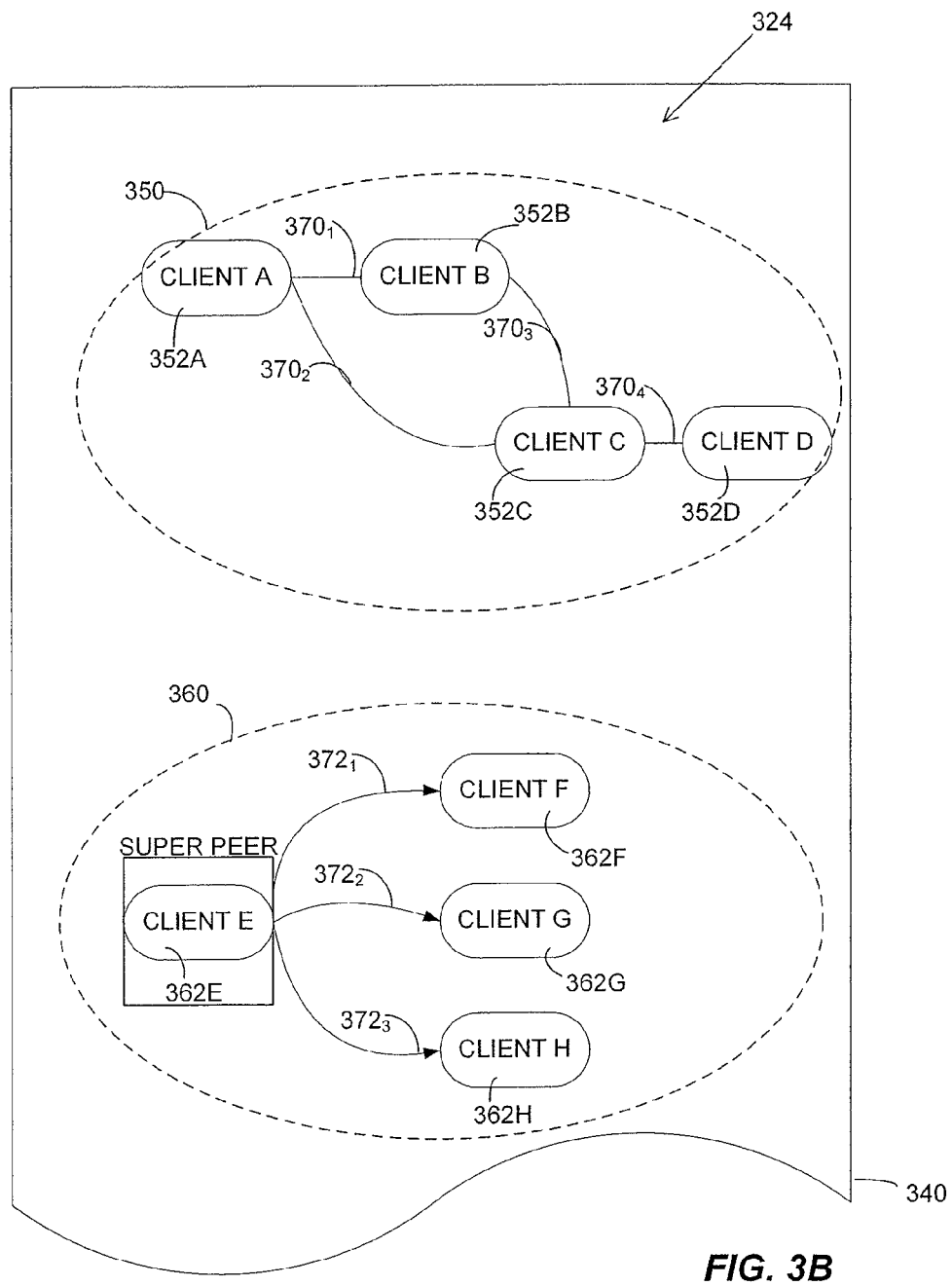
FIG. 3B is a sketch of a data structure that may be used in a peer of a peer-to-peer collaboration system according to an embodiment of the invention.

FIG. 3B provides a sketch of a routing table 324. Such a data structure may be implemented in any suitable way. For example, routing table 324 may be stored as a data structure in computer-readable media 340 within a peer device. However, any suitable mechanism may be used to physically contain routing table 324 and any suitable representation of the information in routing table 324 may be used.

In the embodiment of FIG. 3B, routing table 324 is shown to contain information about peers in a peer-to-peer collaboration session that includes peer 310 (FIG. 3A). As shown, routing table 324 is organized to convey information about groups of peers that may directly communicate. In the embodiment of FIG. 3B, two groups of peers are shown as neighborhoods 350 and 360. Neighborhood 350 is shown to contain four peers 352A, 352B, 352C and 352D. Similarly, neighborhood 360 is shown to contain peers 362E, 362F, 362G and 362H.

In this embodiment, each neighborhood is shown to contain a group of peers that can communicate with at least one other peer in the neighborhood. Within neighborhood 350, peer 352A has formed a connection 370, with peer 352B. Peer 352A has also formed a connection 3702 with peer 352C. Peer 352C has, in turn, formed a connection 3704 with peer 352D. Though peers 352A and 352B do not have a connection formed directly to peer 352D, peers 352A and 352B may communicate with peer 352D by sending a message through peer 352C. Accordingly, peers 352A, 352B, 352C and 352D can all communicate with every other peer within neighborhood 350 without the use of a relay server. Such a configuration may result from all of the peers in neighborhood 350 being behind the same NAT device such that direct peer-to-peer communication is possible. However, other operating conditions can give rise to a grouping of peers as depicted in neighborhood 350. For example, one or more of the peers in neighborhood 350 may not be behind a NAT device. Alternatively, one or more of the peers in neighborhood 350 may be behind a NAT device for which other peers have received address information that would allow them to traverse the NAT.

Neighborhood 360 similarly represents a group of peers for which each peer may communicate with every other peer in the group without the use of a relay server. Though, neighborhood 360 is shown to contain a different connection pattern than neighborhood 350. In the embodiment illustrated, peer 362E acts as a "super peer," meaning that it has established connections with multiple other peer devices. In the embodiment illustrated, peer 362E has established a connection 372, with peer 362F. Super peer 362E has established a connection 3722 with peer 362G and a connection 3723 with peer 362H.

The number and types of connections established between peers in each neighborhood is not critical to the invention. In the embodiment illustrated, communication subsystem 326 (FIG. 3A) in each peer device in a collaboration session may be configured to establish connections with other peers so as to form neighborhoods. The manner in which each peer device determines the peers with which it will establish a connection is not critical to the invention. However, in some embodiments, characteristics of the other peers in the peer-to-peer collaboration session may determine connections between peers. For example, a peer may limit the number of connections it establishes with other peers based on the bandwidth, memory or other resources it has available for sending, receiving or forwarding messages.

Conversely, a peer with resources to process a large number of messages may be programmed to become a super peer by forming a large number of connections. Formation of those connections may be triggered by programming a peer to form multiple connections based on its available resources. Though, in some embodiments, a peer may be triggered to become a super peer by commands or requests sent by a relay server or other devices.

Also, in some embodiments, a peer may establish new connections with other peers where existing connections between peers in a neighborhood do not adequately support timely communication between peers. For example, peer 352A could communication with peer 352D by sending a message to peer 352B for forwarding to peer 352C, which would then forward the message to peer 352D. Such a communication path may be too slow, too lossy or otherwise too error prone for reliable communications between peer 352A and 352D. In response to detecting that existing connections are not adequate, peer 352A may have established a connection 3702, which provides more direct communication to peer 352D. However, the specific connections formed within a network are not critical to the invention. Likewise, the specific mechanisms that are used to trigger the formation of connections between peers in a network are not a limitation of the invention.

Regardless of the specific information about connections between peers conveyed by routing table 324, routing table 324, may be used by communication subsystem 326 (FIG. 3A) to determine addressing information that can be used to broadcast change information to other peers in a collaboration session. For example, routing table 324 may be used to select as few as one peer within each neighborhood to receive a message reporting a change. In the example of FIG. 3B, a message with a change may be addressed initially to peer 352A within neighborhood 350. Peer 352A may distribute the message to peer 352B and 352C. Peer 352C may in turn distribute the message to peer 352D. In a similar fashion, a change message may be initially directed to peer 362E within neighborhood 360. Peer 362E may distribute the message to each of peer 362F, 362G and 362H. In this example, a change message is broadcast to all peers in a collaboration session by initially transmitting the message to only one peer in each neighborhood.

In the embodiment illustrated, each peer maintains a similar routing table. Each peer may therefore use the routing table to select initial recipient peers of each change message originated by that peer. Further, each peer may use its copy of the routing table or rely on an existing broadcasting session to identify peers to which it will forward messages. For example, peer 362E may use its copy of the routing table to forward messages to client 362F, 362G and 362H. In the embodiment illustrated, each recipient peer in a collaboration session broadcasts a change message to its neighborhood in a way such that each peer receives the same message only once. However, in embodiments in which a peer may receive multiple copies of the same message, communication subsystem 326 (FIG. 3A) within each peer may be constructed to ignore duplicate messages.

Each of the peers may construct a routing table in any suitable fashion, such as through exchanges of information with other peers or other devices. In the embodiment illustrated in FIG. 2, servers 232 and 234 exchange information with the peers to facilitate construction of a routing table. From interactions among server 232, server 234 and the peers in the collaboration session, servers 232 and 234 may obtain information that may be used to identify neighborhoods of devices, such as neighborhoods 350 and 360. This information may include an identification of peers that are behind NAT devices and the type of NAT device that each of the peers is behind. In addition, the information may include an identification of address information that can be used to establish connections with other peers.

Servers 232 and 234 (FIG. 2) may collect information on each peer at any suitable time to allow the peers to update their routing tables as the members of the collaboration session change or as some network conditions change that may make peers reachable or unreachable from other peers. As one example, servers 232 and 234 may collect and distribute information when each peer joins a collaboration session.

Information on a new peer may be distributed to each of the peers in the collaboration session, which may then use the information to determine whether to establish a connection with the new peer. Likewise, servers, such as server 232 or 234 may serve as a central distribution point for information about peers that have left a peer-to-peer collaboration session. More generally, one or more servers may distribute information about the peers currently in a collaboration session at any time there is a change in membership of the collaboration session.

Regardless of the specific mechanism by which routing table 324 is formed, it may be desirable in reducing network congestion if NAT devices do not restrict peer-to-peer communication with peers in the collaboration session. Accordingly, if NAT devices are present in a network, it is desirable to identify whether those NAT devices can be traversed to allow peer-to-peer communication. Once the types of NAT devices are identified, suitable NAT traversal techniques may be selected.

The specific NAT traversal techniques employed are not critical to the invention and any suitable techniques may be used. Traversal techniques are known for many types of NAT devices and may be used. For example, NAT traversal techniques are known for NAT types such as Directed IP connection, UPnP NAT, Full Cone NAT, Restricted Cone NAT or Port Restricted Cone NAT, Symmetrical NAT with ISA Server, Symmetrical NAT with Deterministic Port Assignment and a Firewall with restricted outgoing port constraints. It is known that a pair of peers may engage in direct peer-to-peer communication, even though each peer is behind a different NAT device, if a traversal technique appropriate for the pair of NAT devices is available. Accordingly, in establishing peer-to-peer communications, techniques to identify the type of NAT device that each peer is behind may be employed for selection of a traversal technique. NAT identification techniques may identify NAT devices of the types listed above. In addition, the inventors have classified a further type of NAT device, referred to as a "symmetric variant."

A symmetric variant NAT device is one that maps every request from the same internal IP address and port to any destination address and port to the same external IP address but a different port each time. A symmetric variant shows a session dependent binding behavior: address binding is consistent, but the port binding changes for every request from the same internal host. Many NAT devices (e.g., ISA and NetScreen) behave like this when a client binds its local socket to a specific port for an outbound connection request using TCP. A symmetric variant is a variation of a general symmetric NAT, and so can be further classified as a regular symmetric variant NAT with non-deterministic port assignment and one with a deterministic port assignment. A symmetric variant NAT that assigns ports in a deterministic manner is generally traversable as the next port assignment can be predicted.

The inventors have also classified a type of firewall device called a Symmetrical Firewall. A symmetrical firewall is a network device that does not provide any internal host address mapping, but will block any unsolicited connection request from an external host to any internal host behind the firewall. A symmetrical firewall is traversable if an external host can connect to an internal host after the internal host has previously connected to the external host.

To discover the type of a NAT device and then to traverse the NAT, a NAT probing server, such as servers 232 or 234 (FIG. 2) may be used. Such a server may sit in a public area and may be reachable from a peer behind a NAT to be probed. FIG. 2 shows just one possible scenario with two servers. In practice, only one server may be used if the server has two publicly addressable network interfaces. Also, a public relay server, such as server 130', can serve as a probing server.

As part of NAT discovery, a peer may send a sequence of messages to a server to probe about the NAT device and its characteristics. After receiving a peer message, a server sends back a response with the external address and port assigned by the NAT. Because a server responds to the peer message, the message that a peer sends is also called an echo message. A peer sends echo messages to find out whether the client is open on the Internet, or is behind a firewall or an address-translating device such as a NAT device. If a NAT device is found, the peer will also want to find out the type of the NAT. An echo message may also instruct a specific server to connect to a peer at a specific IP address and port to see if the NAT can be traversed successfully. A NAT may be traversed using TCP if a peer behind the NAT detects that an external host has successfully established an inbound connection to the client.

As part of NAT discovery according to an embodiment in which the peers are coupled to a network using TCP, a peer may send the following types of messages to a server:

Echo Test: A peer establishes a TCP connection to a server and then sends a request. The server sends back a response with the peer's mapped external IP address and port. The peer closes the connection after receiving a response.

Echo Hop Test: A peer establishes a TCP connection to a server and then sends a request. The server sends back a response with the peer's mapped external IP address and port, and at the same time, forwards a request to a different server, instructing the second server to connect to the peer at the peer's mapped external IP address and port. The peer closes the connection after receiving a response from the first server.

Echo Test with port change: A peer establishes a TCP connection to a server and then sends a request with a port number. The server sends back a response with the peer's mapped external IP address and port, and then connects to the peer at the mapped external IP address and the received port. The peer closes the connection after receiving a response from the original server.

Sequential Echo Test: A peer simultaneously establishes multiple TCP connections with sequentially assigned port numbers to a server, and the server sends back a response for each connection with the peer's mapped external IP address and port. The peer closes each connection after a response is received for that connection.

A peer may also send other special messages to a server so that a NAT traversal attempt can be arranged between the peer and the server or servers. For example, after a peer finds out it is behind a symmetrical NAT with a predictable port assignment, the peer may send a message with a port assignment range to a server, which in turn, instructs a second server to connect to the peer at the client's external IP address and a port number within the given range.

Figure 4A:
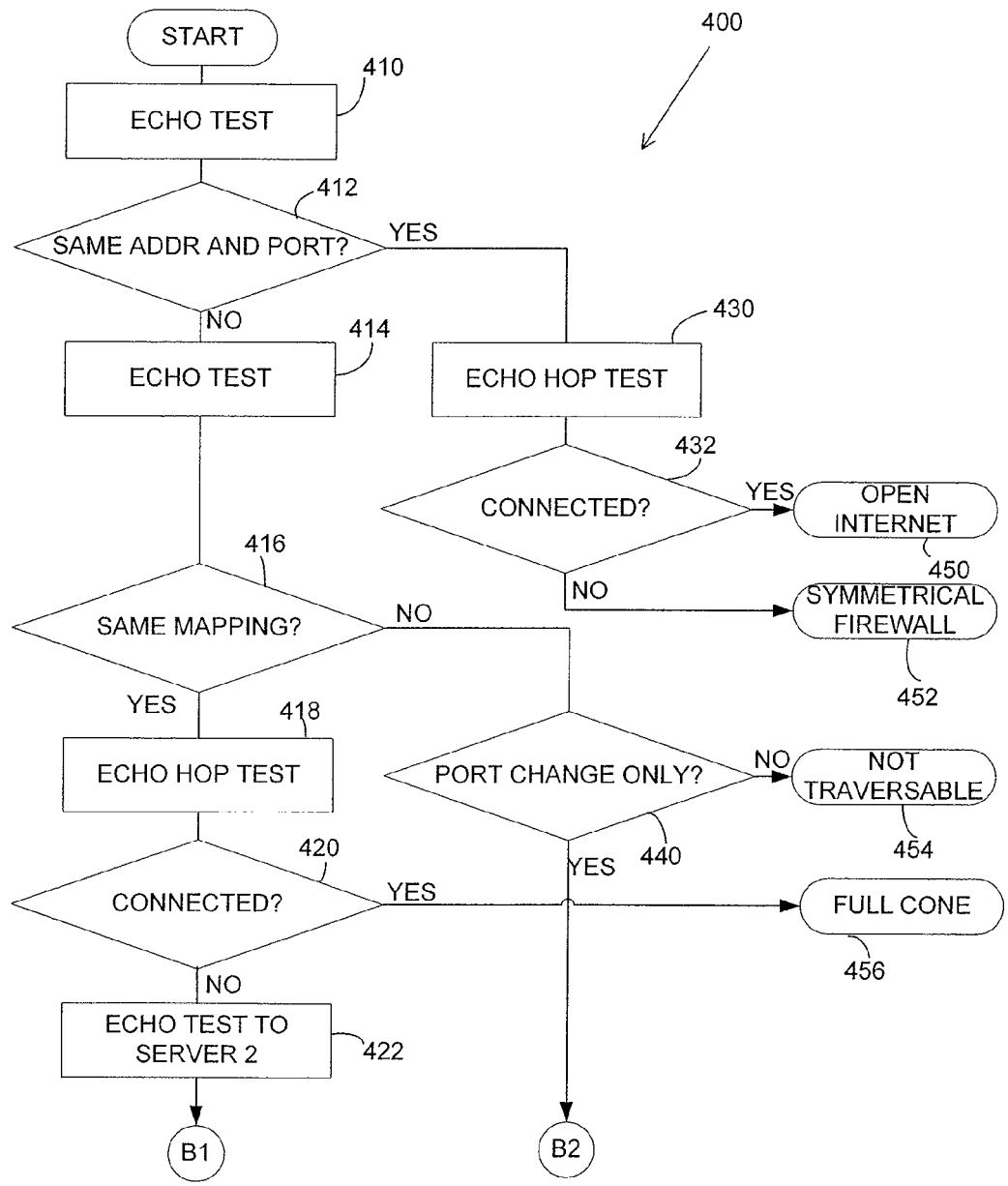
FIGS. 4A and 4B when interconnected at the points labeled B1 and B2 form a flowchart of a process for discovering a type of a NAT device that a peer is behind.
Figure 4B:
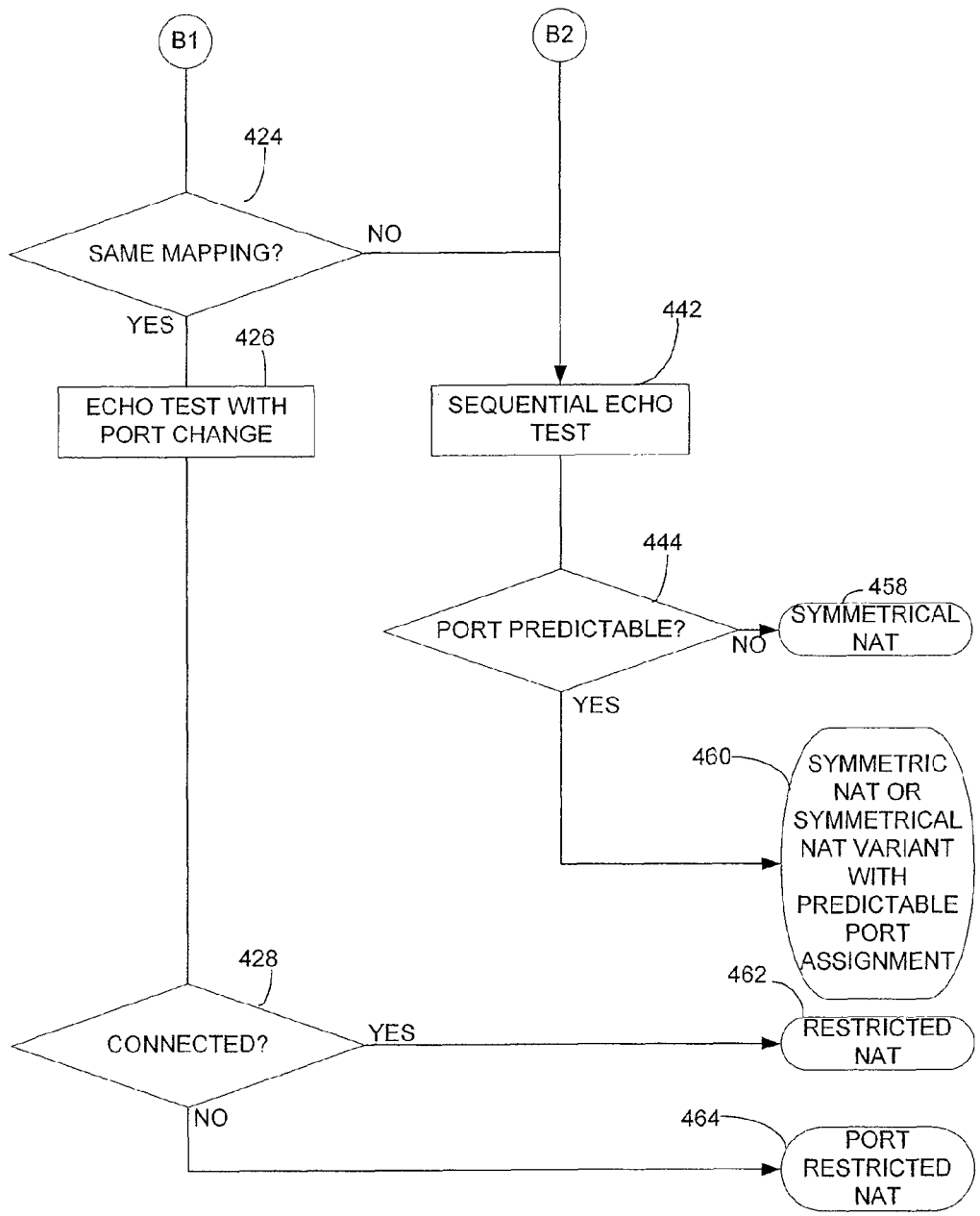

FIGS. 4A and 4B shows a TCP-based NAT discovery process. In the process a peer sends a sequence of echo messages to a server. This process allows a peer to discover if a NAT device exists and the type of the NAT device, if one is found, by establishing a TCP connection to a probing server. The process may discover all cone types of NATs, symmetrical NATs as well as symmetrical variants. In addition, it may also detect whether a peer is open on the Internet or behind a symmetrical firewall. When a NAT is discovered, attempts can be made to traverse the NAT directly or using the simultaneous TCP opens. While FIGS. 4A and 4B depict a sequential order of messages being sent and tests being done, some actions may be carried out concurrently, so the actual order may be different in different embodiments. Therefore, the order of processing is not a limitation on the invention.

The process may start with a peer listening on a port for inbound connections. For each new connection request, the peer may create a socket and bind its local port to the peer's listening port. For example, a peer in a peer-to-peer collaboration session may communicate with its peers or a relay server through a specific port such as 2492, 80 or 443. Here a peer simulates what a peer actually operating in a peer-to-peer collaboration session would do to enable a TCP-based NAT traversal. In order for an inbound connection request to be accepted by the peer, an external host has to connect to an external address and port that the NAT has mapped to the internal address and a port that the peer is listening to.

Once a connection is established, the peer first may send an echo test message to the server at block 410. Upon receiving a mapped IP address and port from the server, the peer may compare the mapped IP address and port with its local IP address and port at decision block 412.

If the addresses and ports are the same, then the peer knows there is no address-translating device installed, but the peer may be behind a firewall. Accordingly, the process branches to block 430. To find out whether the firewall allows inbound connections, the peer sends an echo hop test message at block 430 to a server, which in turn, instructs a second server to connect to the peer's IP address and port. If an inbound connection from the second server can be established successfully, the process branches at decision block 432 to termination point 450. If the process reaches termination point 450, the peer knows that it is open on the Internet; otherwise, the process branches at decision block 432 to termination point 452, where the client determines it is behind a symmetrical firewall that prevents an unsolicited inbound connection attempt. If the firewall is symmetrical, the peer can also send a special message to a server so that the peer and a server can arrange to connect to each other simultaneously to see if an inbound connection to the client can be established. An established inbound connection indicates that the symmetrical firewall is traversable.

Conversely, if the peer's external IP address and port are different from the peer's internal IP address and port, then the peer can conclude that it is behind an address translating device. Accordingly, the process branches from decision block 412 to block 414. At block 414, the peer conducts another echo test with the server and then compares the new mapped external IP address and port with the ones from the previous echo test.

The process branches at decision block 416 based on the results of that comparison. If the mappings are different, then the NAT's address binding is session dependent, meaning that the NAT binding changes for each outbound connection. A NAT device with a session dependent binding behavior is usually difficult to traverse. Accordingly, if the mapping, as determined at decision block 416 is different, the process branches to decision block 440. The process further branches at decision block 440 based on whether the only changes in the mapping are in the port. If changes are not limited to the port, the process branches to termination point 454. If the process reaches termination point 454, the peer may conclude that it is behind a device that is not traversable.

However, if the NAT consistently binds to the same external address, with only the port changing for each session, then the NAT is considered a symmetric variant NAT. In this condition, the process branches from decision block 440 to block 442. At block 442, the peer will probe the NAT's port assignment pattern with a sequential echo test. The results of a sequential test may be used to indicate whether the NAT assigns its port deterministically or unpredictably. If the port assignment is not deterministic, the process branches from decision block 444 to termination point 458. If the process reaches termination point 458, the peer may conclude that it is behind a symmetrical NAT. Conversely, if the port assignment is predictable, the process branches from decision block 444 to termination point 460. If the process reaches termination point 460, the client may conclude that it is behind a symmetric NAT or a symmetrical NAT variant with predictable port assignment.

Conversely, if the same mapping was detected at decision block 416, the process branches to block 418. At block 418, the peer can begin a sub-process to test whether it is behind a cone NAT device. To obtain more information about the type of the NAT device, the peer may send an echo hop test to a first server and wait for a second server to connect to it. If a connection from the second server is established successfully, then the peer is behind a full cone NAT device. Accordingly, the process branches from decision block 420 to termination point 456, where the client may conclude that it is behind a full cone NAT device.

Conversely, if no inbound connection from the second server is accepted after a time out interval, the process may branch from decision block 420 to block 422. At block 422, the peer may send an echo test message to the second server. The process may then branch at decision block 424 based on the mapping received from the second server. If the mapped address and port from the second server are different from the ones from the first server, then the NAT may be regarded as a symmetrical NAT. Accordingly, the process may branch a decision block 424 to block 442 for processing, as described above, consistent with a symmetrical NAT.

Conversely, if the mapped addresses and ports from the two servers remain the same, the process branches to block 426. At block 426, the peer may send an echo test message with a port change to the first server. The peer may then wait for the first server to connect to it from the specified port.

The process may branch at decision block 428 depending on whether the peer successfully accepts an inbound connection. If an inbound connection is established, the process branches to termination point 462, where the peer concludes that it is behind a restricted NAT device. Otherwise, the process branches from decision block 428 to termination point 464, where the peer concludes that it is behind a port restricted NAT device.

The type of NAT device identified may dictate the format of communications. If the NAT is port-restricted, the peer can send a special message to a server so that the peer and a server can arrange to connect to each other simultaneously to see if an inbound connection to the peer can be established. An established inbound connection indicates that the port restricted NAT is traversable using TCP connections.

If the NAT is found to be a symmetrical NAT or a symmetrical variant, the peer may run a sequence of echo tests to a server with sequential local ports. The mapped external ports from these echo tests will be analyzed to determine whether the NAT assigns its next port within a small range or in a predictable manner. If the port number is assigned predictably or with a small increment, then the NAT is classified as a symmetrical NAT with a deterministic port assignment; otherwise, it is a symmetrical NAT with non-deterministic port assignment.

If the NAT is a symmetrical NAT or a symmetrical variant with a deterministic port assignment, the peer can send a special message to a server so that the peer and a second server can arrange to connect to each other simultaneously to see if an inbound connection to the peer can be established. In this case the second server will connect to the peer's mapped external IP address and a predicted port. An established inbound connection indicates that the symmetrical NAT is traversable. A symmetrical NAT or a symmetrical variant with non-deterministic port assignment is generally considered as non-traversable.

When traversing a symmetrical NAT or a symmetrical variant with a deterministic port assignment, it may be necessary for an external host to simultaneously connect to a number of ports within a predicted range to improve the chance of a successful traversal.

Accordingly, the process of FIGS. 4A and 4B may be used by peers to determine their connectivity status. Each peer in a peer-to-peer collaboration system may perform a process similar to the process shown in FIGS. 4A and 4B to determine its connectivity status. Information sent to the peer, such as in response to an echo test, may be used in combination with the determination of the NAT device type to identify mechanisms to communicate with that peer. Each peer may share this information with other peers in the peer-to-peer collaboration session. In the embodiment illustrated in FIG. 2, this information may be shared through relay server 130'. However, the information may be shared in any other suitable way, including through servers 232 and 234.

Regardless of how conductivity information for each of the peers is determined and shared with other peers, once this information is available to the peers in a peer-to-peer collaboration system, it may be used to support one or more modes of addressing messages to other peers that avoids the use of a relay server. These modes of addressing may be used alone or in combination to route messages to peers in a peer-to-peer collaboration system.

Figure 5A:
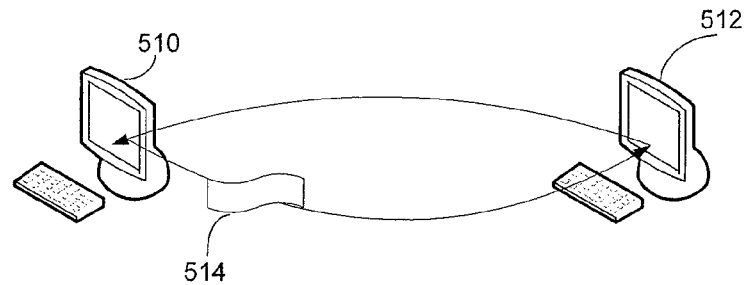
FIGS. 5A, 5B and 5C illustrate forms of addressing that may be used for peer-to-peer communication according to embodiments of the invention.

FIG. 5A illustrates a direct addressing mode. In the configuration illustrated in FIG. 5A, peer 510 generates a change message 514, which is addressed directly to peer 512. Such direct addressing may be used when no NAT device is connected between peers 510 and 512 or when peers 510 and 512 have identified a NAT traversal technique that can traverse any NAT devices between peers 510 and 512.

Figure 5B:
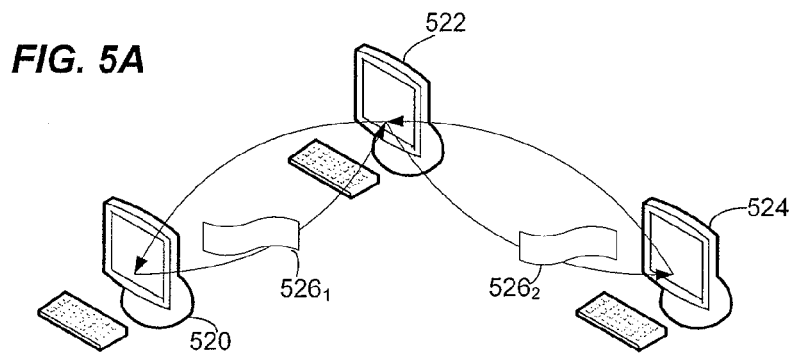

FIG. 5B illustrates a further addressing mode. In the scenario illustrated in FIG. 5B, peers 520, 522 and 524 are in the same neighborhood. Peer 520 has established a connection with peer 522. Peer 522 has in turn established a connection with peer 524. In this scenario, peer 520 initiates a change message $526_1$. Message $526_1$ is addressed to peer 522.

Upon receipt of message $526_1$, peer 522 addresses a forwarded message $526_2$ to peer 524. In this way, a change generated within peer 520 may be distributed to both peers 522 and 524.

Figure 5C:
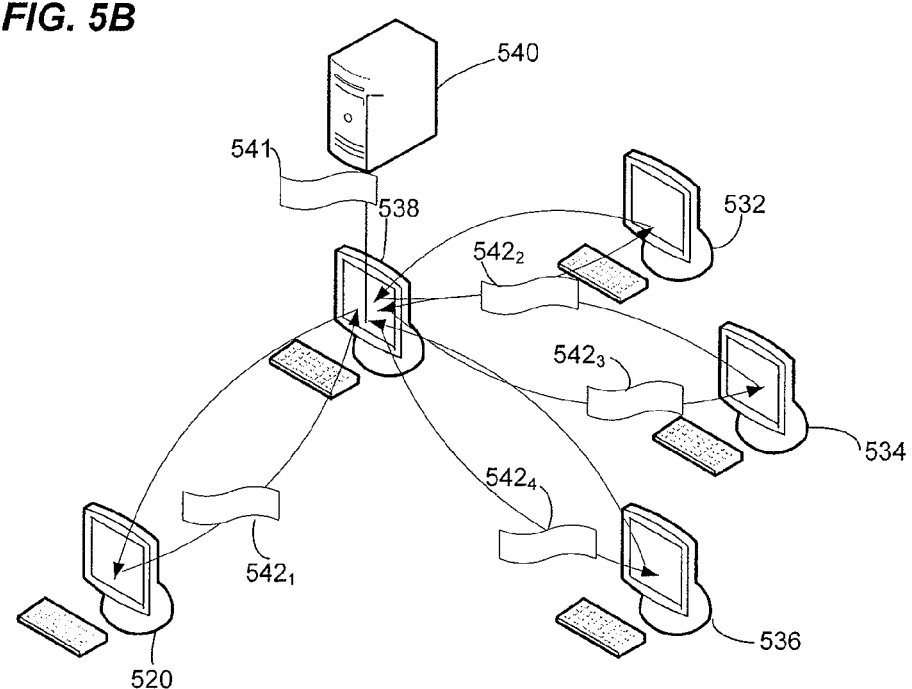

FIG. 5C illustrates a further scenario in which change messages may be communicated to multiple peers in neighborhood without being relayed through a server. In the scenario illustrated in FIG. 5C, peers 520, 532, 534, and 536 are all in the same neighborhood. Peer 538 is also connected in that neighborhood.

In the embodiment illustrated, peer 520 generates a change message $542_1$. Message $542_1$ is addressed to peer 538. Upon receipt of such a message, peer 538 generates a forwarded message $542_2$ addressed to peer 532, a forwarded message $542_3$ addressed to peer 534 and a forwarded message $542_4$ addressed to peer 536.

In the embodiment illustrated, peer 538 may act as a super peer, forwarding received messages to multiple other peers. In the embodiment illustrated, server 540, though it does not participate in forwarding change messages, may coordinate operation of peers within a neighborhood. In this embodiment, server 540 may be relay server as in a conventional peer-to-peer collaboration system but may be modified to configure peers as super peers. For example, relay server 540 may poll each peer for its hardware configurations as the peer joins a collaboration session. Relay server 540 may therefore have information about each of the peer devices that will allow it to identify peer devices having bandwidth, memory and other resources that would enable the peer device to handle more message traffic than other peer devices. Accordingly, relay server 520 may send a control message 541 to peer 538, signaling to peer 538 that it should act as a super peer. A device designated as a super peer may attempt to establish connections with multiple devices in its neighborhood.

Control message 541 may contain information of any suitable type to designate the parameters of operation of peer 538 as a super peer. For example, control message 541 may identify the number of peer devices to which super peer 538 should establish connections. Though, the specific information exchanged between a controlling server, such as relay server 540 and a peer device designated as super peer is not a limitation on the invention.

Furthermore, the communications between a controlling server, such as relay server 540, and a device designated as a super peer, such as peer 538, may be two-way. For example, peer device 538 may provide information to relay server 540 about the volume of message traffic processed by peer 538. Such messages may communicate to relay server 540 that further super peers are required in a neighborhood to reduce the load on peer 538 or to alleviate the potential for network congestion.

In response to such a message, relay server 540 may designate another device within a neighborhood as a super peer. However, the timing or events that trigger the designation of a peer as a super peer are not a limitation on the invention. For example, one or more devices may be designated as super peers at the initiation of a collaboration session among multiple peers. Alternatively, a controlling server, such as relay server 540, may monitor or otherwise receive information relating to a peer-to-peer collaboration session and designate one or more devices as super peers in response to such information.

In some embodiments, a relay server collects information (such as CPU power, memory, uptime, etc.) about peers to decide which peers can become super peer candidates. A relay server may promote a candidate in a neighborhood to be a super peer when traffic or resource usage on the neighborhood peers exceeds a certain threshold. For example, if each peer creates a connection to every other peer in a neighborhood, thus forming a fully meshed connectivity network, then when the number of peers grows, a peer may exceed its resources and therefore request a relay server to assign a super peer to the neighborhood.

Figure 6:
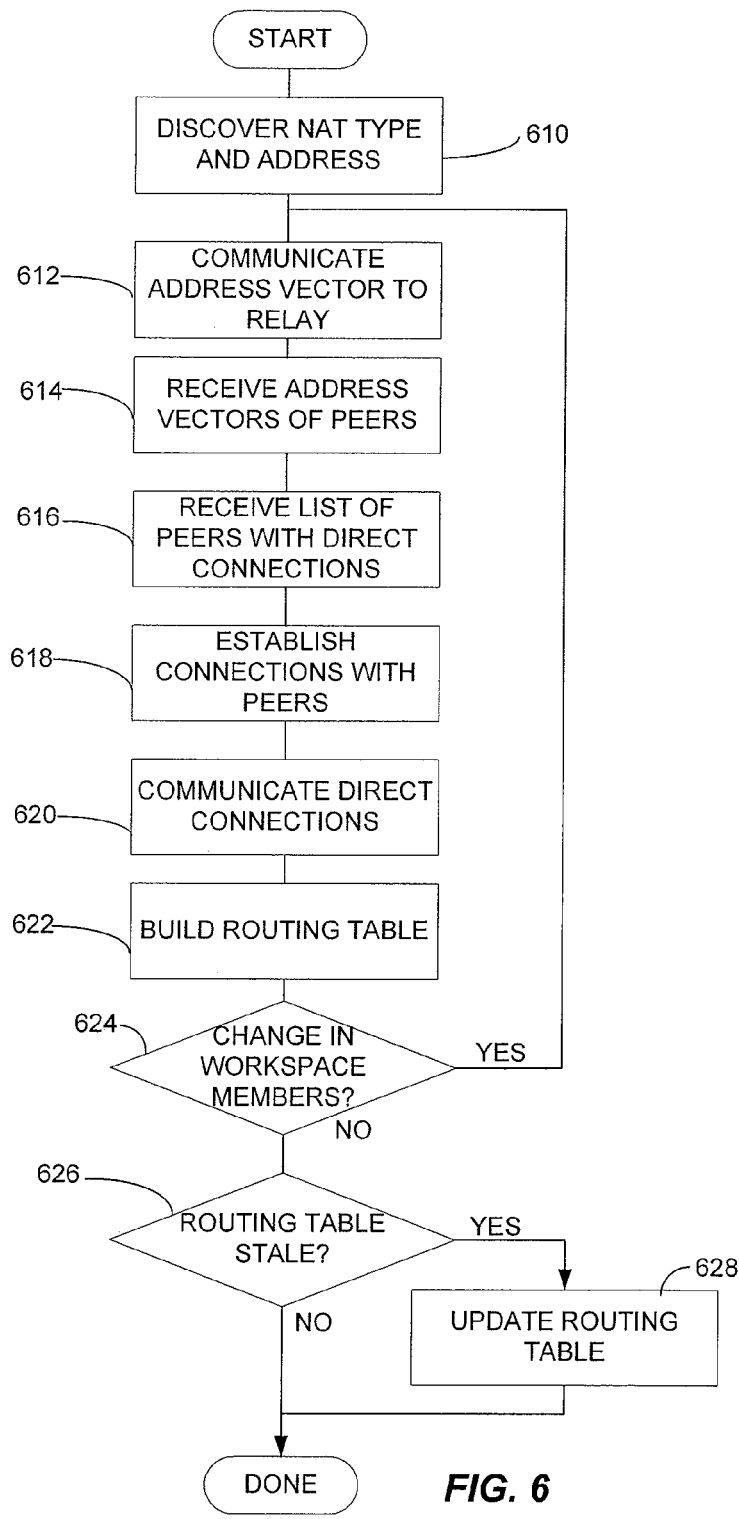
FIG. 6 is a flowchart of a process of maintaining a routing table in a peer according to an embodiment of the invention.

Regardless of whether and how super peers are established within neighborhoods, information about neighborhoods contained within a routing table may be used to identify mechanisms to communicate change messages without involving a relay server. In the embodiment depicted in FIG. 3A, information on neighborhoods is stored in routing tables that are constructed by each device in a peer-to-peer collaboration session. FIG. 6 provides an example of a process by which a device may form a routing table as it joins a peer-to-peer collaboration session.

The process of FIG. 6 begins at block 610 where the peer attempts to discover the type of a NAT device, if any, that it is behind. Additionally, at block 610, the peer determines an address that other peer devices may use to direct messages to it. This information may be obtained in any suitable way. For example, the process illustrated in FIGS. 4A and 4B may be used.

Regardless of how this information is obtained, it may be used to form an address vector describing how other peer devices may communicate with the peer. At block 612, this address vector is shared with other peers in the peer-to-peer session. In the embodiment illustrated, a peer shares its address vector with other peers by communicating the address vector to a relay server. The relay server may communicate the address vector directly to all other peers in the collaboration session or indirectly through one or more other relay servers that are configured to facilitate communications among peers in the collaboration session.

In addition to obtaining its own address vector, each peer receives address vectors for other peers in a collaboration session. In the embodiment illustrated, each peer receives address vectors for all other peers in a peer-to-peer collaboration session from its own relay server. However, the specific mechanism through which each peer receives address vectors of other peers in a collaboration session is not a limitation on the invention and any suitable mechanism may be used.

In addition to receiving information about address vectors, each peer may receive information about connections already established between peers. For example, as shown in FIG. 3B, peer 352A has established a connection 370, with peer 352B. However, even though peer 352A is in the same neighborhood as peer 352D, peer 352A has not established a direct connection with peer 352D. Accordingly, the process of FIG. 6 includes a process block 616 at which the peer receives a list of other peers that have established direct connections.

The process continues to block 618. At block 618, the peer may establish connections with one or more peers using any suitable mechanism. For example, processing at block 618 may include an exchange of messages in a "handshaking" protocol that establishes a connection. The specific messages exchanged may depend on the protocol used to by the network interconnecting the peers. Accordingly, the specific mechanism to establish a connection is not a limitation on the invention.

Regardless of how a connection is established, at process block 620, the peer may share with other peers the direct connections it has established. Information about connections may be shared by providing this information to a relay server or through the peer's direct connections. However, any suitable mechanism may be used for sharing such information.

Regardless of how the information is shared with other peers, the process proceeds to block 622. At block 622, the peer may construct a routing table. The peer may use information contained in the address vectors of other peers received at block 614, information received at block 616 about direct connections and information about its own connections established at block 618 to identify neighborhoods of peers and the interconnections within those neighborhoods. This information may be reflected in a routing table such as routing table 324 pictured in FIG. 3B. However, any suitable mechanism may be used to capture this information.

A peer may use the routing table built at block 622 for communicating change messages in a peer-to-peer collaboration session. The peer may continue to use the routing table until a change in the members in workspace is detected. When a change in workspace membership is detected, the routing table may no longer be accurate. Accordingly, some or all of the process of establishing a routing table may be repeated to construct an updated routing table. Accordingly, when a change in workspace membership or network configuration is detected, the process branches from decision block 624 back to block 612. The process of building a routing table is repeated starting at block 612, and a peer will perform steps as necessary to keep its routing table up to date.

In some instances, a routing table may become stale, even if changes in workspace membership are not detected. For example, a peer may lose a connection with another peer, therefore changing the connections between peers. A connection may be lost for any number of reasons, such as performance problems in the network, overloading, or user commands given to a peer in a peer-to-peer network. Accordingly, a routing table may be updated from time-to-time. Any suitable mechanism may be used to determine when to update routing tables. For example, all peers in a peer-to-peer collaboration system may update their routing tables at periodic intervals. Alternatively, any device in a peer-to-peer collaboration system may signal to other devices to update their routing tables in response to sensed conditions in the collaboration system. For example, if a device experiences a large number of communication failures when messages are sent directly from peer-to-peer, loses a connection or establishes a new connection, the device may signal to other devices to refresh their routing tables by sending information about the affected connections.

Regardless of how it is determined that the routing tables used in a peer-to-peer collaboration session are stale, when the tables are determined to be stale, the process branches from decision block 626 to block 628 where the process of building the routing table may be repeated. For example, a peer may detect that its routing table is stale because a connection to other peers in a neighborhood is no longer available. The peer may update its routing table when stale. As each peer uses its own routing table to send messages, it will eventually detect that a connection is lost and then update its routing table accordingly. Two peers who lost the connection to each other can go through a NAT probing process if their network configuration has changed. If the connection is lost due to performance reasons, for example, traffic overload, then the peers can wait until a later time to reestablish the connection when the load is at a more suitable level.

The process depicted in FIG. 6 may be repeated in each of the peers in a peer-to-peer collaboration session so that each peer may maintain a routing table useful for effectively communicating with other peers according to an edge routing technique.

Figure 7:
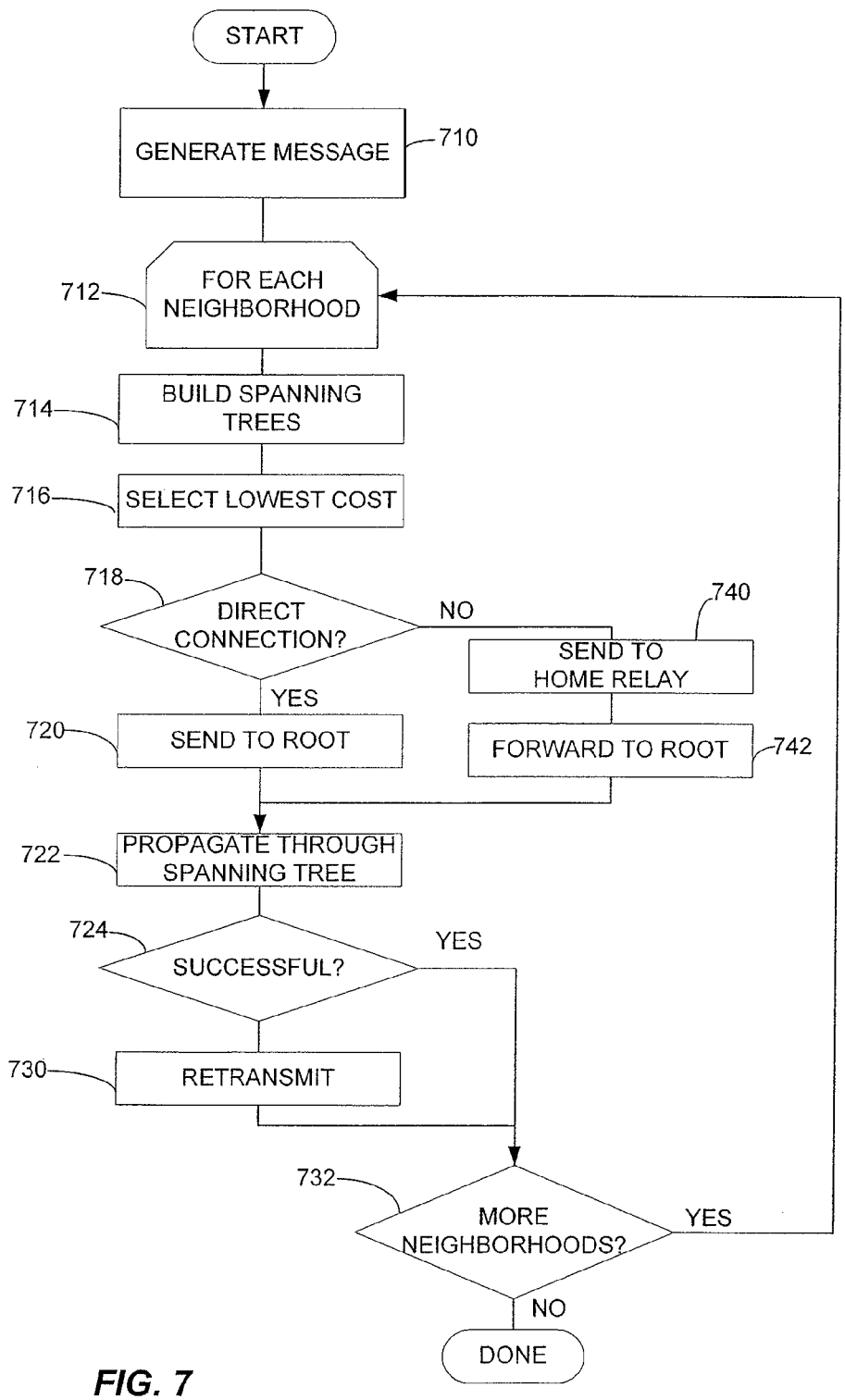
FIG. 7 is a flowchart of a process for transmitting a message according to an embodiment of the invention.

FIG. 7 illustrates a process by which a peer may use a routing table to broadcast change information to other peers using edge routing techniques. The process of broadcasting begins at block 710. At block 710, a peer generates a message. The message generated at block 710 may be a change message in a format used by a known peer-to-peer collaboration system. However, the type and format of the message is not a limitation on the invention.

In the example of FIG. 7, the message is intended for broadcast to all peers in the peer-to-peer collaboration system. However, the format of the message and the number of recipient peers are not limitations on the invention. The message generated at block 710 may be in any suitable format and may be directed to any one or more of the peers in the peer-to-peer collaboration session.

Regardless of the type of message and the intended recipients of the message, the process proceeds to loop start 712. Loop start 712 represents the start of processing performed for each neighborhood of peers containing a peer to receive the message generated at block 710. The neighborhoods may be identified using a routing table as constructed according to the process of FIG. 6. However, the neighborhoods may be identified in any suitable fashion.

Regardless of how the neighborhoods are identified, the process continues to block 714. At block 714, for the selected neighborhood, one or more spanning trees are constructed. Each spanning tree defines distribution paths through which all peers in the neighborhood intended to receive the message generated at block 710 can be addressed. For example, two possible spanning trees may be constructed for neighborhood 350 (FIG. 3B). To reach all of the peers in neighborhood 350, a message could be directed to peer 352A for forwarding to client 352B and 352C, with client 352C forwarding the message received from peer 352A to peer 352B. Conversely, a spanning tree could be constructed by peer 352A transmitting a message to peer 352B, which would in turn forward the message to peer 352C. Peer 352D could then receive the message forwarded by peer 352C. Thus, in the simplified example of FIG. 3B, two spanning trees are possible for network 350. For a neighborhood containing more peers with more complex interconnections between the peers, more than two spanning trees may be identified. The mechanism by which spanning trees are identified at block 714 is not critical to the invention. However, in some embodiments, the routing tables maintained by the peers may be regarded as directed graphs in which case known algorithms for constructing spanning trees across a directed graph may be used.

Regardless of how these spanning trees are constructed, the process proceeds to block 716. At block 716, a spanning tree built at block 714 is selected. In the embodiment illustrated, the selection is based on a lowest "cost." In this context, "cost" may represent any metric or metrics use to indicate a performance characteristic of the peer-to-peer collaboration system. For example, the spanning tree that, relative to the other spanning trees, requires a message to be forwarded the fewest number of times may be selected as the lowest cost spanning tree. Alternatively, a spanning tree that results in the fewest number of messages being forwarded through congested nodes may be selected as the lowest cost spanning tree. However, any suitable metric may be used as an indication of cost at block 716.

Regardless of how the spanning tree is selected, the process continues to decision block 718. At decision block 718, the process branches depending on whether the neighborhood selected at loop start 712 may be reached by a direct connection from the peer executing the process of FIG. 7. In the embodiment illustrated, a simple way to perform the check at decision block 718 is to determine whether the initiating peer belongs to the selected neighborhood. If it is its own neighborhood, the peer may create a spanning tree with itself as the root, and then broadcast a change message along that spanning tree.

If the selected neighborhood may be reached directly, the process branches to block 720. At block 720 a message is sent directly to a peer forming the root node of the selected spanning tree. Conversely, if the initiating peer does not belong to the selected neighborhood, the process branches from decision block 718 to block 740. At block 740, the message is sent to the home relay of the peer performing the process of FIG. 7. The message may be sent to a home relay in the same way that messages are sent to the home relay of peers in conventionally peer-to-peer collaboration systems. However, any suitable mechanism may be used to perform the processing at block 740.

At block 742, the home relay forwards the message to the root node of the selected spanning tree. The message may be forwarded by the home relay as in a conventional peer-to-peer collaboration system. Forwarding the message may be performed by sending the message directly to the peer acting as the root node of the selected spanning tree. Alternatively, the message may be forwarded through one or more relay servers before reaching a relay server that can communicate with the peer that is the root node of the spanning tree.

Regardless of whether the message is sent to the root node directly at block 720 or indirectly through one or more relay servers at block 742, the process continues to block 722. At block 722, the message is propagated through the spanning tree. Propagation may be initiated by the root node forwarding the message to those nodes with which it has direct connections. Those peers may then forward the message to other peers in the spanning tree with which they have a direct connections as reflected in the routing table. However, any suitable mechanism for propagating a message may be used.

At decision block 724, the process branches depending on whether the message reached all peers in the neighborhood intended to receive the message. If so, the process branches to decision block 732, where the process further branches depending on whether more neighborhoods remain to be processed. If so, the process branches back to loop start 712, where processing is repeated on the next neighborhood. Conversely, if no neighborhoods remain, the processing terminates.

Though, if the transmission was not successful, the process branches to block 730, where the message may be retransmitted. The message may be retransmitted in the same way as the initial message or a different routing path can be chosen to send the message to its destination peer. However, if multiple avenues are possible to send a message to a peer that did not receive the message, a different avenue may be tried upon retransmission. The avenues may be tried in any suitable order. However, in the illustrated embodiment, retransmission using a relay server may be tried as the final resort, reflecting an effort to reduce load on relay servers.

Regardless of the mechanism by which retransmission occurs, one successful, the process proceeds to decision block 732, where the process will be repeated for the next neighborhood, if there is one, or will end.

As described above, the amount of messages in a peer-to-peer collaboration system that are transmitted directly addressed to other peers can be increased, which can reduce load on relay servers, allowing a lower cost and/or more effective peer to peer collaboration system.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of joining a computing device that is behind a Network Address Translation (NAT) device to a peer-to-peer collaboration session which includes a plurality of peers, the method comprising:

communicating, by the computing device, with a home relay server to discover a type of the NAT device;

determining, by the computing device based on the type of the NAT device, an address vector of the computing device that can be used by the peers of the peer-to-peer collaboration session for traversing the NAT device and directly transmitting messages to the computing device without use of the home relay server;

communicating, by the computing device, the address vector of the computing device to the home relay server for sharing the address vector of the computing device with the peers of the peer-to-peer collaboration session;

receiving, by the computing device from the home relay server, address vectors of the peers of the peer-to-peer collaboration session;

receiving, by the computing device from the home relay server, a list of peers that have established direct connections to other peers of the peer-to-peer collaboration session; and constructing, by the computing device, a routing table based on the address vectors of the peers of the peer-to-peer collaboration session and the list of peers that have established direct connections to other peers of the peer-to-peer collaboration session, the routing table comprising:

a first group representing peers of the peer-to-peer collaboration session to which the computing device can directly transmit messages without the use of the home relay server, the first group including at least one peer designated as a first super peer by the home relay server, wherein the first super peer is configured to:

receive messages comprising collaboration information from the computing device via direct peer-to-peer transmission; and forward the messages to other peers in the first group with which the first super peer has established a direct connection; and a second group representing peers of the peer-to-peer collaboration session to which the computing device can indirectly transmit messages through the home relay server, the second group including at least one peer designated as a second super peer by the home relay server, wherein the second super peer is configured to:

receive messages comprising collaboration information from the computing device via indirect transmission through the home relay server; and forward the messages to other peers in the second group with which the second super peer has established a direct connection.

2. The method of claim 1, further comprising:
sending, by the computing device, a probing packet to the home relay server; and
receiving, by the computing device, a response to the probing packet from the home relay server.

3. The method of claim 1, further comprising:
sending, by the computing device, at least one message comprising collaboration information to the first super peer in the first group.

4. The method of claim 1, further comprising:
broadcasting, by the computing device, a change message to the peers of the peer-to-peer collaboration session based on the routing table.

5. The method of claim 1, further comprising:
updating, by the computing device, the routing table in response to detecting that a connection to a peer of the peer-to-peer collaboration session has been lost.

6. The method of claim 1, further comprising:
sending, by the computing device, at least one message comprising collaboration information to the home relay server for forwarding to the second super peer in the second group.

7. The method of claim 1, wherein:
the peers of the second group are behind a second NAT, and the computing device is unable to traverse the second NAT.

8. A computer-readable storage device storing computer-executable instructions that, when executed by a computing device that is behind a Network Address Translation (NAT) device, cause the computing device to perform a method of joining a peer-to-peer collaboration session which includes a plurality of peers, the method comprising:
communicating with a home relay server to discover a type of the NAT device;
determining, based on the type of the NAT device, an address vector of the computing device that can be used by the peers of the peer-to-peer collaboration session for traversing the NAT device and directly transmitting messages to the computing device without use of the home relay server;
communicating the address vector of the computing device to the home relay server for sharing the address vector of the computing device with the peers of the peer-to-peer collaboration session;
receiving, from the home relay server, address vectors of the peers of the peer-to-peer collaboration session;
receiving, from the home relay server, a list of peers that have established direct connections to other peers of the peer-to-peer collaboration session; and
constructing a routing table based on the address vectors of the peers of the peer-to-peer collaboration session and the list of peers that have established direct connections to other peers of the peer-to-peer collaboration session, the routing table comprising:
a first group representing peers of the peer-to-peer collaboration session to which the computing device can directly transmit messages without the use of the home relay server, the first group including at least one peer designated as a first super peer by the home relay server, wherein the first super peer is configured to:
receive messages comprising collaboration information from the computing device via direct peer-to-peer transmission; and
forward the messages to other peers in the first group with which the first super peer has established a direct connection; and
a second group representing peers of the peer-to-peer collaboration session to which the computing device can indirectly transmit messages through the home relay server, the second group including at least one peer designated as a second super peer by the home relay server, wherein the second super peer is configured to:
receive messages comprising collaboration information from the computing device via indirect transmission through the home relay server; and
forward the messages to other peers in the second group with which the second super peer has established a direct connection.

9. The computer-readable storage device of claim 8, wherein the method further comprises:
sending a probing packet to the home relay server; and
receiving a response to the probing packet from the home relay server.

10. The computer-readable storage device of claim 8, wherein the method further comprises:
sending at least one message comprising collaboration information to the first super peer in the first group.

11. The computer-readable storage device of claim 8, wherein the method further comprises:
broadcasting a change message to the peers of the peer-to-peer collaboration session based on the routing table.

12. The computer-readable storage device of claim 8, wherein the method further comprises:
updating the routing table in response to detecting that a connection to a peer of the peer-to-peer collaboration session has been lost.

13. The computer-readable storage device of claim 8, wherein the method further comprises:
sending at least one message comprising collaboration information to the home relay server for forwarding to the second super peer in the second group.

14. The computer-readable storage device of claim 8, wherein:
the peers of the second group are behind a second NAT, and the computing device is unable to traverse the second NAT.

15. A computing device comprising:
a processor for executing computer-executable instructions; and
memory storing computer-executable instructions for joining the computing device to a peer-to-peer collaboration session that includes a plurality of peers when the computing device is behind a Network Address Translation (NAT) device, the computer-executable instructions comprising instructions for:
communicating with a home relay server to discover a type of the NAT device;
determining, based on the type of the NAT device, an address vector of the computing device that can be used by the peers of the peer-to-peer collaboration session for traversing the NAT device and directly transmitting messages to the computing device without use of the home relay server;
communicating the address vector of the computing device to the home relay server for sharing the address vector of the computing device with the peers of the peer-to-peer collaboration session;
receiving, from the home relay server, address vectors of the peers of the peer-to-peer collaboration session;
receiving, from the home relay server, a list of peers that have established direct connections to other peers of the peer-to-peer collaboration session; and constructing a routing table based on the address vectors of the peers of the peer-to-peer collaboration session and the list of peers that have established direct connections to other peers of the peer-to-peer collaboration session, the routing table comprising:
- a first group representing peers of the peer-to-peer collaboration session to which the computing device can directly transmit messages without the use of the home relay server, the first group including at least one peer designated as a first super peer by the home relay server, wherein the first super peer is configured to:
  - receive messages comprising collaboration information from the computing device via direct peer-to-peer transmission; and
  - forward the messages to other peers in the first group with which the first super peer has established a direct connection; and
- a second group representing peers of the peer-to-peer collaboration session to which the computing device can indirectly transmit messages through the home relay server, the second group including at least one peer designated as a second super peer by the home relay server, wherein the second super peer is configured to:
  - receive messages comprising collaboration information from the computing device via indirect transmission through the home relay server; and
  - forward the messages to other peers in the second group with which the second super peer has established a direct connection.

16. The computing device of claim 15, the computer-executable instructions further comprising instructions for:
sending a probing packet to the home relay server; and
receiving a response to the probing packet from the home relay server.

17. The computing device of claim 15, the computer-executable instructions further comprising instructions for:
sending at least one message comprising collaboration information to the first super peer in the first group.

18. The computing device of claim 15, the computer-executable instructions further comprising instructions for:
broadcasting a change message to the peers of the peer-to-peer collaboration session based on the routing table.

19. The computing device of claim 15, the computer-executable instructions further comprising instructions for:
sending at least one message comprising collaboration information to the home relay server for forwarding to the second super peer in the second group.

20. The computing device of claim 15, wherein:
the peers of the second group are behind a second NAT, and
the computing device is unable to traverse the second NAT.

* * * * *